United States Patent
Ahn et al.

(10) Patent No.: US 9,066,060 B2
(45) Date of Patent: *Jun. 23, 2015

(54) METHOD OF STORING STATUS INFORMATION ABOUT CONTENT REPRODUCING DEVICE, AND METHOD AND APPARATUS FOR ALLOWING CONTENT TO BE AUTOMATICALLY REPRODUCED USING THE STATUS INFORMATION

(71) Applicant: SAMSUNG ELECTRONICS CO., LTD., Suwon-si (KR)

(72) Inventors: Hyo-in Ahn, Seoul (KR); Chang-seog Ko, Hwaseong-si (KR); Sung-soo Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 186 days.

This patent is subject to a terminal disclaimer.

(21) Appl. No.: 13/711,419

(22) Filed: Dec. 11, 2012

(65) Prior Publication Data

US 2013/0101270 A1    Apr. 25, 2013

Related U.S. Application Data

(63) Continuation of application No. 12/581,922, filed on Oct. 20, 2009, now Pat. No. 8,346,055.

(30) Foreign Application Priority Data

Nov. 19, 2008    (KR) .................. 10-2008-0115324

(51) Int. Cl.
*H04N 9/80* (2006.01)
*H04N 9/82* (2006.01)

(52) U.S. Cl.
CPC ............... *H04N 9/80* (2013.01); *H04N 9/8205* (2013.01)

(58) Field of Classification Search
CPC ............................. H04N 9/80; H04N 9/8205
USPC .......... 386/239, 240, 241, 248, 291, 200, 231
See application file for complete search history.

(56) References Cited

U.S. PATENT DOCUMENTS

2004/0186593 A1*  9/2004  Senoo et al. ................ 700/1
2007/0050076 A1   3/2007  Yamazaki et al.

(Continued)

FOREIGN PATENT DOCUMENTS

KR    1020040074489 A    8/2004
KR    1020050001554 A    1/2005

(Continued)

OTHER PUBLICATIONS

Communication dated Sep. 22, 2014, issued by the Korean Intellectual Property Office in counterpart Korean Application No. 10-2008-0115324.
Communication issued on Mar. 23, 2015 by the Korean Intellectual Property Office in related Application No. 1020080115324.

*Primary Examiner* — Robert Chevalier
(74) *Attorney, Agent, or Firm* — Sughrue Mion, PLLC

(57) ABSTRACT

Provided are a method of storing status information in a first content reproducing device, and a method of allowing content to be automatically reproduced in a second content reproducing device based on the status information stored in the first content reproducing device. The method of storing status information includes: monitoring an operation of the first content reproducing device; generating status information about the monitored operation; and storing the status information in the first content reproducing device. The method of allowing content to be automatically reproduced includes: checking if the first and second content reproducing devices are connected to each other; reading a log file recording the status information from the first content reproducing device if the first and second content reproducing devices are connected to each other; interpreting the status information; and selectively performing an operation according to a result of the interpreting.

16 Claims, 7 Drawing Sheets

(56) References Cited

U.S. PATENT DOCUMENTS

2009/0328086 A1 12/2009 Yanagimoto
2010/0235531 A1 9/2010 Min et al.

FOREIGN PATENT DOCUMENTS

KR 10-2005-0029604 A 3/2005
KR 10-2005-0039070 A 4/2005

* cited by examiner

DEVICE A (110)    DEVICE B (120)

FIG. 3

| PARAMETER NAME | DESCRIPTION | VALUE |
|---|---|---|
| Type | CONTENT TYPE | Music |
| Mode | OPERATING MODE | play |
| power | POWER INFORMATION | on |
| dcmURL | CONTENT PATH | Artist%Album%Track |
| fileName | CONTENT FILE NAME | Tell me_WONDER GIRLS.mp3 |
| directory | FILE LOCATION | C:/Music/POPULAR SONG/ WONDER GIRLS_ALBUM 1 |
| time | RUNNING TIME | 03:50 |
| set | REPRODUCTION SETTING | default |
| Type | CONTENT TYPE | photo |
| THE REST ARE SAME AS FORMAT OF THE MUSIC STATUS INFORMATION | | |
| ⋮ | | |
| Type | CONTENT TYPE | Video |
| THE REST ARE SAME AS FORMAT OF THE MUSIC STATUS INFORMATION | | |

MUSIC STATUS INFORMATION (310): rows Type through set

PHOTO STATUS INFORMATION (320): Type (photo) and rest

VIDEO STATUS INFORMATION (330): Type (Video) and rest

FIG. 4

```
Type=Music;Mode=play;power=on;
dcmURL=Artist%Album%Track;fileName=
Tell me_Wonder girls.mp3;directory= C:/Music/
popular song/Wonder girls_album 1;time=03:50;set=default;
Type=Photo;Mode=···;···
Type=Video;Mode=···;···
```

METHOD OF STORING STATUS INFORMATION ABOUT CONTENT REPRODUCING DEVICE, AND METHOD AND APPARATUS FOR ALLOWING CONTENT TO BE AUTOMATICALLY REPRODUCED USING THE STATUS INFORMATION

CROSS-REFERENCE TO RELATED PATENT APPLICATION

This is a Continuation of application Ser. No. 12/581,922 filed Oct. 20, 2009 and claims priority from Korean Patent Application No. 10-2008-0115324, filed on Nov. 19, 2008, in the Korean Intellectual Property Office, the disclosure of which is incorporated herein in its entirety by reference.

BACKGROUND OF THE INVENTION

1. Field of the Invention

Apparatuses and method consistent with the present invention related to storing status information about a content reproducing device and allowing content to be automatically reproduced using the status information.

2. Description of the Related Art

As much attention has recently been paid to inter-connection between devices in a wired/wireless environment, content has been actively exchanged between devices connected to one another via a cable or under a remote control. Also, as use of televisions (TVs) having a wired/wireless universal serial bus (USB) or a high-definition multimedia interface (HDMI) becomes more widespread, a user can easily deliver various contents to a TV and evaluate them via a wide, high-resolution screen. For example, user-created content (UCC) manufactured using a camcorder or a personal computer (PC), images captured using a digital camera, or MP3 music files can be easily delivered to and reproduced in a TV and be evaluated via a large-scale screen. Also, a wired/wireless USB may be applied to a home theater so that image files can be displayed via a large-scale screen in a convenient manner. As the total number of HDMIs for a TV increases more and more, multiple devices, such as game consoles, camcorders, and digital cameras, can be connected at a time in order to exchange content therebetween.

As exchange of content between digital devices has been actively conducted as described above, there is a growing need for development of a method of effectively displaying content according to the user's intentions when exchange of the content is conducted. However, according to a related art method of reproducing content when a first device is connected to a second device, the same content is searched for again through a multimedia application menu screen provided after the connection and is reproduced in the second device.

FIGS. 1ᵃ to 1D illustrate a related art method of reproducing content while content devices are connected. In detail, FIG. 1A to 1D illustrate a method of connecting a device A 110 to a device B 120 and reproducing the content in the device B 120.

For example, while the device A 110, which is a mobile device, displays a first picture (see FIG. 1A), the device A 110 is connected to the device B 120 in order to view the first picture via a wide, high-resolution screen of the device B 120 (see FIG. 1B). Then, the first picture is searched for again through menu selection in a data center management (DCM) main screen displayed on the device B 120 (see FIG. 1C). Lastly, the first picture is selected and displayed in the device B 120 (FIG. 1D).

Thus, after the device A 110 and the device B 120 are connected, it is inconvenient since the user should search for the first picture again via the DCM main screen in the device B 120. Accordingly, there is a need to develop a method of allowing content to be automatically reproduced without having to perform a complicated search process so that a user can seamlessly evaluate the content in an optimal environment.

SUMMARY OF THE INVENTION

The present invention provides a method and apparatus for allowing content to be automatically reproduced in a second device based on status information regarding a first device connected to the second device, thereby minimizing user inconvenience.

According to an aspect of the present invention, there is provided a method of storing status information in a first multimedia content reproducing device, the method including monitoring an operation of the first multimedia content reproducing device; generating status information indicating a history of the monitored operation; and storing the status information in the first multimedia content reproducing device. The status information includes at least one parameter necessary to perform an operation, which has been performed in the first multimedia content reproducing device before the first multimedia content reproducing device is connected to a second multimedia content reproducing device, in the second multimedia content reproducing device after the connection.

The storing of the status information may include recording the status information in a log file.

The at least one parameter may indicate at least one of a type of content used in the first multimedia content reproducing device; an operating mode of the content; whether the first multimedia content reproducing device is powered on or off; a content path of the content; a name of a file of the content; a location of the file; a running time of the content; a reproduction setting value of the content; and a location of the file being currently focused on.

If the monitored operation is to reproduce a content file in the first multimedia content reproducing device, the generating of the status information may set the at least one parameter in order to reproduce the same content file in the second multimedia content reproducing device.

The generating of the status information may include determining a parameter to indicate a location of a part of the content file, which is lastly reproduced in the first multimedia content reproducing device before the first multimedia content reproducing device is connected to the second multimedia content reproducing device.

If the monitored operation is to browse a content file, the generating of the status information may include determining the at least one parameter in order to output the same content file according to a browsing application in the second multimedia content reproducing device.

If the monitored operation reveals that the first multimedia content reproducing device is powered off, the generating of the status information may include determining the at least one parameter to indicate that the first multimedia content reproducing device is powered off.

The generating of the status information may be periodically performed during the operation of the first multimedia content reproducing device.

The generating of the status information may be performed whenever a transaction of each of operations of the first multimedia content reproducing device is completed.

The generating of the status information may be performed whenever the first multimedia content reproducing device is connected to the second multimedia content reproducing device.

According to another aspect of the present invention, there is provided a method of allowing content to be automatically reproduced in a second multimedia content reproducing device based on status information stored in a first multimedia content reproducing device, the method including checking whether the first multimedia content reproducing device is connected to the second multimedia content reproducing device; if the checking reveals that the first multimedia content reproducing device is connected to the second multimedia content reproducing device, reading a log file recording the status information from the first multimedia content reproducing device; interpreting the status information; and selectively performing an operation according to a result of the interpreting. The status information includes at least one parameter necessary to perform a same operation, which has been performed in the first multimedia content reproducing device before the first multimedia content reproducing device is connected to the second multimedia content reproducing device, in the second multimedia content reproducing device after the connection.

The interpreting of the status information may include parsing the status information recorded in the log file.

The at least one parameter may indicate at least one of a type of content used in the first multimedia content reproducing device; an operating mode of the content; whether the first multimedia content reproducing device is powered on or off; a content path of the content; a name of a file of the content; a location of the file; a running time of the content; a reproduction setting value of the content; and a location of the file being currently focused on.

The reading of the log file recording the status information may be performed whenever the first multimedia content reproducing device is connected to the second multimedia content reproducing device.

If the interpreting reveals that a content file is reproduced, the selective performing of the operation according to the result of the interpreting may include reproducing the same content file in the second multimedia content reproducing device.

The selective performing of the operation according to the result of the interpreting may include reproducing the content file starting from a location of a part of the content file, which is lastly reproduced in the first multimedia content reproducing device before the first multimedia content reproducing device is connected to the second multimedia content reproducing device.

If the interpreting reveals that a content file is browsed, the selective performing of the operation according to the result of the interpreting may include outputting the same content file according to a browsing application in the second multimedia content reproducing device.

If the interpreting reveals that the first multimedia content reproducing device is powered off, the selective performing of the operation according to the result of the interpreting may include powering on the first multimedia content reproducing device, and then, either reproducing the content file starting from a part of the content file, which is lastly reproduced in the first multimedia content reproducing device before the first multimedia content reproducing device is connected to the second multimedia content reproducing device, or performing a default operation of the first multimedia content reproducing device.

If the interpreting reveals that the first multimedia content reproducing device has been setting the device, the selective performing of the operation according to the result of the interpreting may include performing a default operation of the first multimedia content reproducing device.

According to another aspect of the present invention, there is provided an apparatus for storing status information in a first multimedia content reproducing device, the apparatus including a monitoring unit monitoring an operation of the first multimedia content reproducing device; a status information generation unit generating status information indicating a history of the monitored operation; and a status information storage unit storing the status information in the first multimedia content reproducing device. The status information may include at least one parameter necessary to perform an operation, which has been performed in the first multimedia content reproducing device before the first multimedia content reproducing device is connected to a second multimedia content reproducing device, in the second multimedia content reproducing device after the connection.

According to another aspect of the present invention, there is provided an apparatus for allowing content to be automatically reproduced in a second multimedia content reproducing device based on status information stored in a first multimedia content reproducing device, the apparatus including a connection checking unit checking whether the first multimedia content reproducing device is connected to the second multimedia content reproducing device; a reading unit reading a log file recording the status information from the first multimedia content reproducing device when the checking reveals that the first multimedia content reproducing device is connected to the second multimedia content reproducing device; a status information interpretation unit interpreting the status information; and an operation performing unit selectively performing an operation according to a result of the interpreting. The status information may include at least one parameter necessary to perform a same operation, which has been performed in the first multimedia content reproducing device before the first multimedia content reproducing device is connected to the second multimedia content reproducing device, in the second multimedia content reproducing device after the connection.

The status information interpretation unit may include a parsing unit that parses the status information recorded in the log file.

According to another aspect of the present invention, there is provided a computer readable recording medium having recorded thereon a computer program for executing the method of storing status information in a multimedia content reproducing device and the method of allowing content to be automatically reproduced based on status information.

BRIEF DESCRIPTION OF THE DRAWINGS

The above and other aspects of the present invention will become more apparent by describing in detail exemplary embodiments thereof with reference to the attached drawings, in which:

FIG. 3 illustrates a data format of status information recorded in a log file according to an exemplary embodiment;

FIG. 4 illustrates a log file according to an exemplary embodiment;

DETAILED DESCRIPTION OF EXEMPLARY EMBODIMENTS

Hereinafter, exemplary embodiments will be described in greater detail with reference to the accompanying drawings.

As exchange of content between digital devices is actively being conducted, a method of effectively reproducing content according to a user's intention is needed. Thus, it is important to determine the status of a first device so that the content can be automatically reproduced in a second device connected to the first device. For example, if a USB driver that is reproducing video content is inserted into a USB terminal of a TV or is wirelessly connected to the TV, the video content is then directly reproduced in the TV. That is, if the first device that is reproducing video is connected to the second device via a USB, the second device should be able to recognize the status of the first device so that the video can be automatically reproduced in the second device. To this end, the present invention provides a method and apparatus for allowing content to be automatically reproduced.

Figure 1A:
FIGS. 1A to 1D illustrate a related art method of reproducing content while content devices are connected.
Figure 1B:
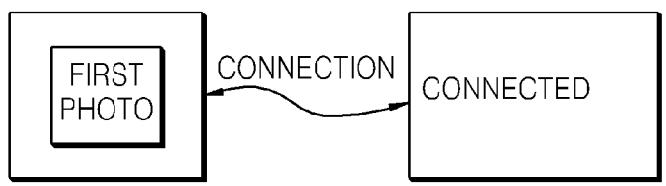
Figure 1C:
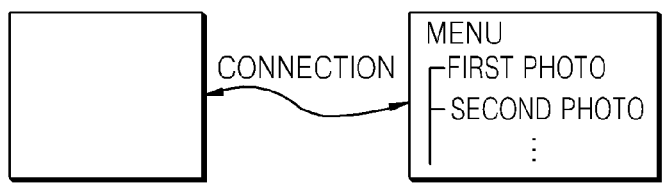
Figure 1D:
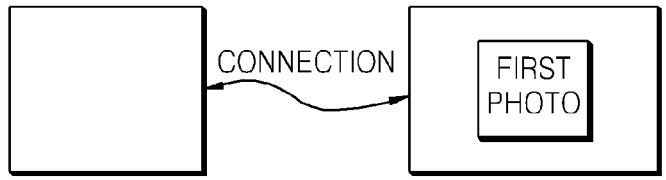
Figure 2:
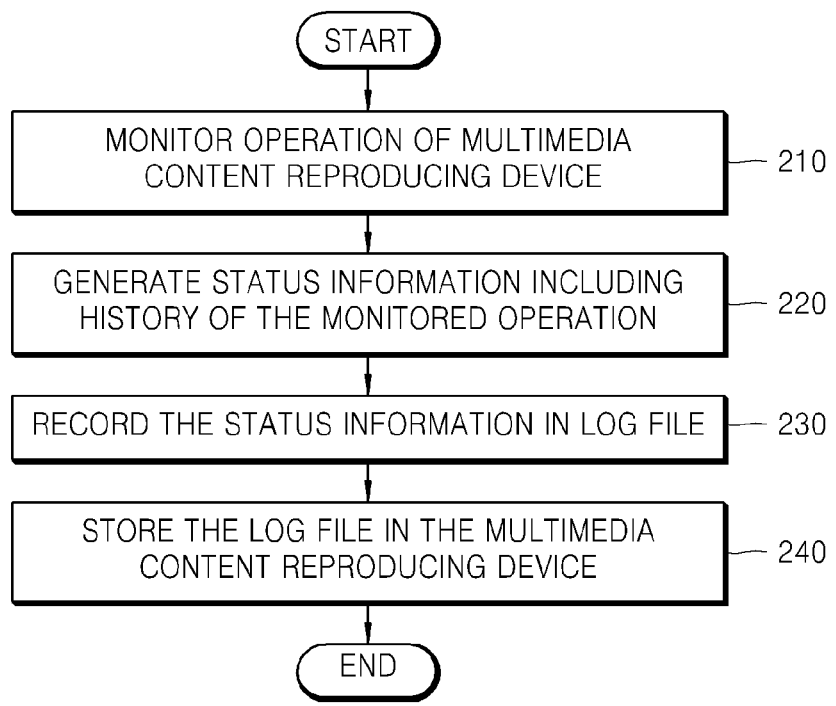
FIG. 2 is a flowchart illustrating a method of storing status information in a multimedia content reproducing device according to an exemplary embodiment.

FIG. 2 is a flowchart illustrating a method of storing status information in a multimedia content reproducing device according to an exemplary embodiment. The method of FIG. 2 includes monitoring an operation of a first multimedia content reproducing device (210), generating status information including a history of the monitored operation (220), and storing the status information in the first multimedia content reproducing device (240). The method may further include recording the status information in a log file (230).

Specifically, in operation 210, an operation of the first multimedia content reproducing device is monitored. Various operations, e.g., reproduction, searching, and configuration, which are performed in the first multimedia content reproducing device may be monitored.

In operation 220, status information including the history of the monitored operation is generated. The status information is generated in the form of meta data including information, e.g., various reproduction histories, regarding the first multimedia content reproducing device. The status information specifies not only reproduction of content but also all operations monitored.

The status information may be either periodically generated at predetermined intervals of time during the operation of the first multimedia content reproducing device, or may be generated whenever a transaction of each operation of the first multimedia content reproducing device is completed.

Alternatively, the status information may be generated the moment connection of the first multimedia content reproducing device to a second multimedia content reproducing device is recognized.

In operation 230, the status information is recorded in a log file. The log file basically includes a text file (.TXT) but may include an extensible markup language (XML) or a binary code.

In operation 240, the log file is stored in the first multimedia content reproducing device. Accordingly, various operations performed by a content reproducing device may be recorded, and the recording result is interpreted by another content reproducing device connected to the content reproducing device via wire or wirelessly, thereby guaranteeing seamless content reproduction.

FIG. 3 illustrates a data format of status information recorded in a log file according to an exemplary embodiment. Referring to FIG. 3, the status information is generated while a device that is to be connected reproduces audio/video (A/V) content.

The status information includes at least one parameter necessary to perform a same operation again according to the type of an operation of a multimedia content reproducing device that is to be connected to another device. Referring to FIG. 3, the at least one parameter may indicate a content type, operating modes, whether power is on or off, a content path, a name of a file, a location of the file, a running time, a reproduction setting value, and so on.

Specifically, FIG. 3 illustrates music status information 310, photo status information 320, and video status information 330. The music status information 310 will now be described in detail.

According to the music status information 310, a content type is 'music', a current operating mode is 'play', power is on, and a content path is 'Aritist % Album % Track'. Similarly, the name and location of a file, a running time, and a reproduction setting value may also be indicated.

Fields related to such parameters may be added or modified according to the type of device, i.e., according to an operation performed by the device. For example, if a mobile device that is browsing a specific file is connected to a TV via a USB, the location of the file on which the mobile device is focused should not be changed even after the mobile device is connected to the TV.

The construction of a log file in which status information is recorded will now be described with reference to FIG. 4 and based on the data format of the status information illustrated in FIG. 3.

FIG. 4 illustrates a log file according to an exemplary embodiment. Referring to FIG. 4, a log file (log.txt) is illustrated as an example of the log file. For example, as will later be described with reference to FIG. 6, a content device, e.g., a TV, which is connected to a mobile device during reproduction of content in the mobile device, may reproduce the same content by reading and interpreting such a log file.

Figure 5:
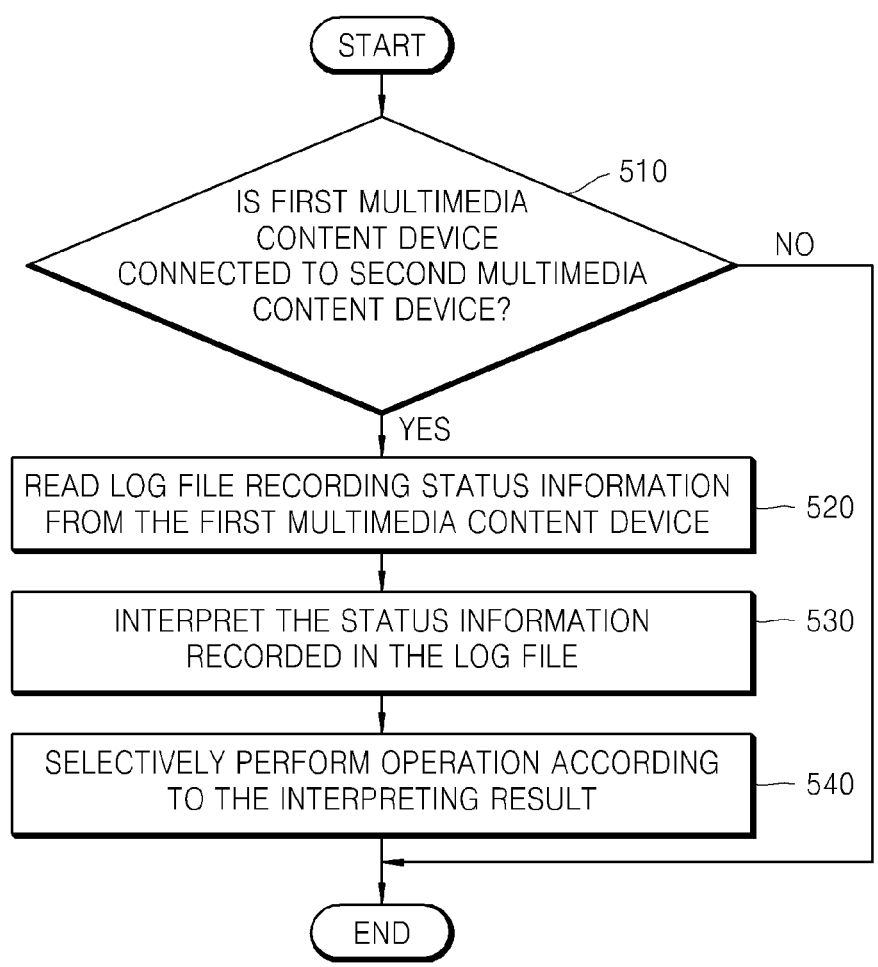
FIG. 5 is a flowchart illustrating a method of allowing content to be automatically reproduced in a multimedia content reproducing device based on status information, according to an exemplary embodiment.

FIG. 5 is a flowchart illustrating a method of allowing content to be automatically reproduced in a multimedia content reproducing device based on status information according to an exemplary embodiment. Specifically, FIG. 5 illustrates a method of allowing content to be automatically reproduced in a second multimedia content reproducing device based on status information stored in a first multimedia content reproducing device. The method of FIG. 5 includes checking whether the first multimedia content reproducing device is connected to the second multimedia content reproducing device (510), reading a log file recording status information from the first multimedia content reproducing device when the first multimedia content reproducing device is connected to the second multimedia content reproducing device (520), interpreting the status information recorded in the log file (530), and selectively performing an operation according to the interpreting result (540).

Here, it is assumed that the first multimedia content reproducing device is a mobile phone and the second multimedia content reproducing device is a digital TV.

In operation 510, it is determined whether the mobile phone is connected to the TV via a connection interface such as a USB or an HDMI. In this case, for example, a function, such as plug and play, may be used.

In operation 520, if it is determined in operation 510 that the mobile phone is connected to the TV, a log file is read from the mobile phone.

In operation 530, status information, such as that shown in FIG. 4, which is recorded in the log file, is interpreted. In this case, the method of FIG. 5 may further include parsing the status information recorded in the log file.

In operation 540, the TV selectively performs an operation according to a result of the interpreting. For example, if the interpreting result reveals that a content file was being reproduced in the mobile phone before the mobile phone was connected to the TV, the content file may be automatically reproduced in the TV. In this case, the content file may be reproduced starting from a beginning part of the content file or or from the point at which the content file was being reproduced right before the connection.

An application for reproducing the content file may be automatically called or activated by the TV or may be selectively designated in the TV by a user.

If the interpreting result reveals that a content file was being browsed in the mobile phone before the connection of the mobile phone to the TV, then the content file may also be browsed in the TV. To this end, an application having a browsing function may be performed in the TV.

If the interpreting result reveals that the mobile phone was powered off before the mobile phone was connected to the TV, then the mobile phone may be powered on, and then, either content that was lastly reproduced in the mobile phone before the connection may be reproduced in the TV or a default operation of the mobile phone may be performed in the TV. Here, for example, the default operation may be an operation of reproducing a plurality of pieces of music in the order that they are stored in the mobile phone, or an operation of presenting a plurality of photos stored in mobile phone in the form of a slideshow.

If the interpreting result reveals that the mobile phone was in a setting mode, i.e., that an operation other than reproduction of content or browsing was being performed, before the mobile phone was connected to the TV, then the default operation of the mobile phone may also be performed in the TV.

Figure 6:
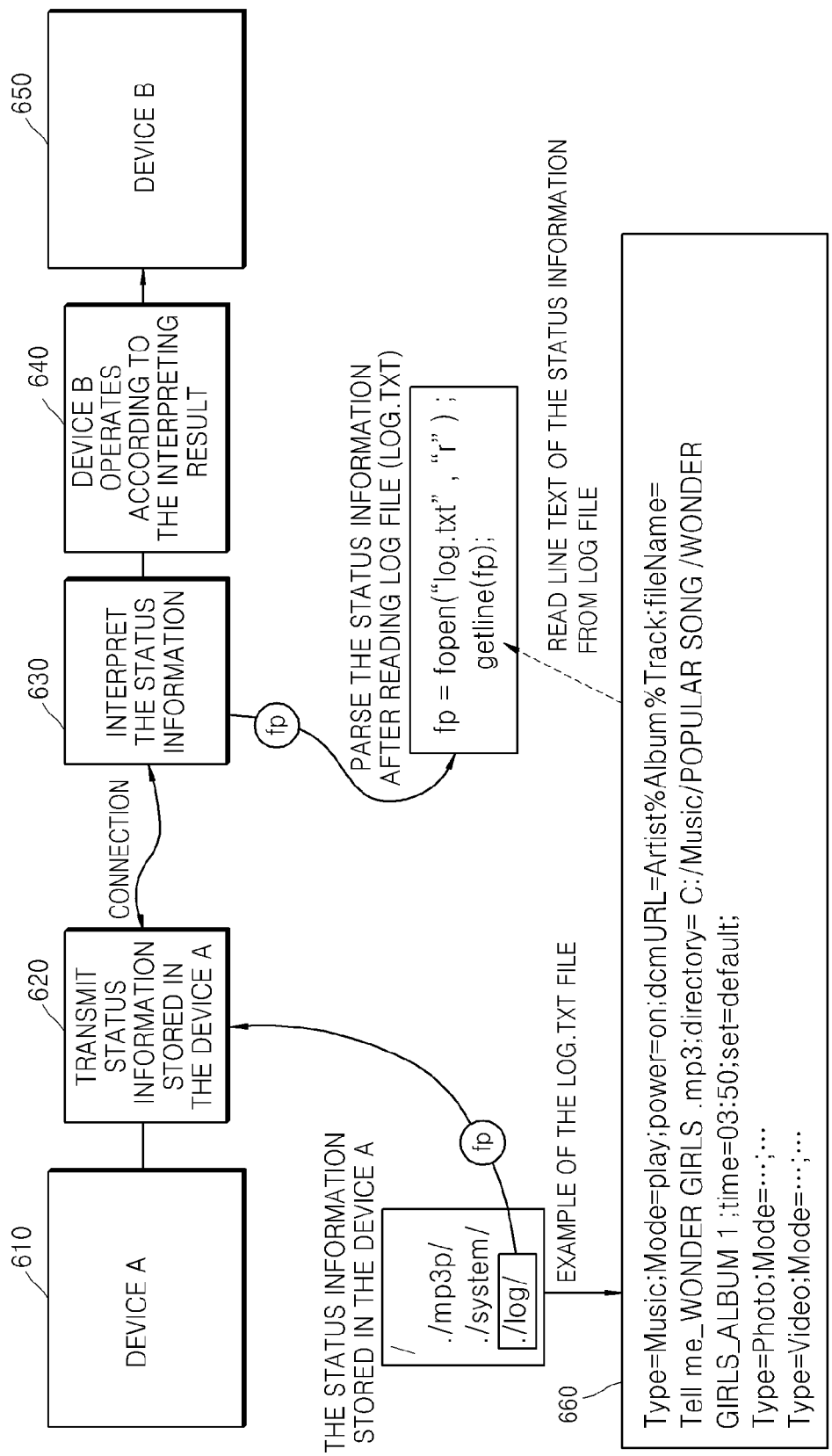
FIG. 6 is a block diagram illustrating a process of reproducing content by reading and interpreting status information when a device A and a device B are connected, according to an exemplary embodiment.

FIG. 6 is a block diagram illustrating a process of reproducing content by reading and interpreting status information when a device A 610 and a device B 650 are connected according to an exemplary embodiment. In detail, FIG. 6 illustrates a process of allowing content to be automatically reproduced when the device A 610 is connected to the device B 650.

According to an exemplary embodiment, status information regarding the device A 610 was stored in the device A 610 before the device A 610 was connected to the device B 650. Alternatively, the status information may be stored in the device A 610 at the moment when it is determined that the device A 610 is connected to the device B 650.

The status information is recorded in a log file (log.txt) 660 as described above with reference to FIG. 4.

If the device A 610 is connected to the device B 650, the device A 610 may transmit the status information to the device B 650 (620). Alternatively, the device B 650 may directly read the status information from the device A 610 when it is connected thereto.

The device B 650 recognizes that it is connected to the device A 610 and reads a corresponding line of the log file (log.txt). Next, the device B 650 parses the read line of the status information (630). Then, the device B 650 performs a same operation that was performed in the device A 610 before the connection between the device A 610 and the device B 650, according to a history of content reproduction recorded in the status information, based on a result of the parsing (640).

Figure 7:
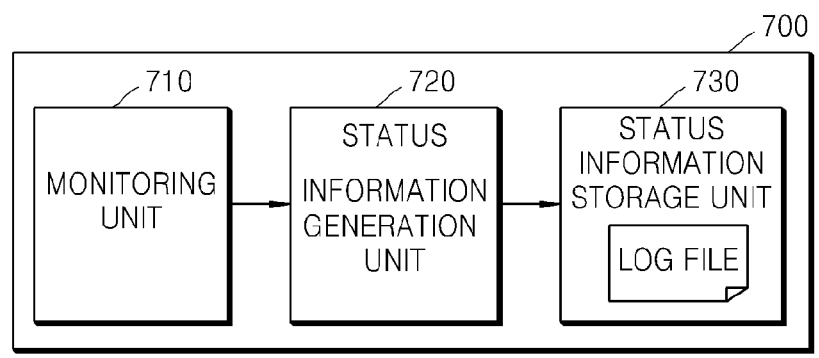
FIG. 7 is a block diagram of an apparatus for storing status information in a multimedia content reproducing device, according to an exemplary embodiment.

FIG. 7 is a block diagram of an apparatus 700 for storing status information in a multimedia content reproducing device according to an exemplary embodiment. Referring to FIG. 7, the apparatus 700 includes a monitoring unit 710 that monitors an operation of the multimedia content reproducing device, a status information generation unit 720 that generates status information indicating a history of the monitored operation, and a status information storage unit 730 that stores the status information in the multimedia content reproducing device.

Figure 8:
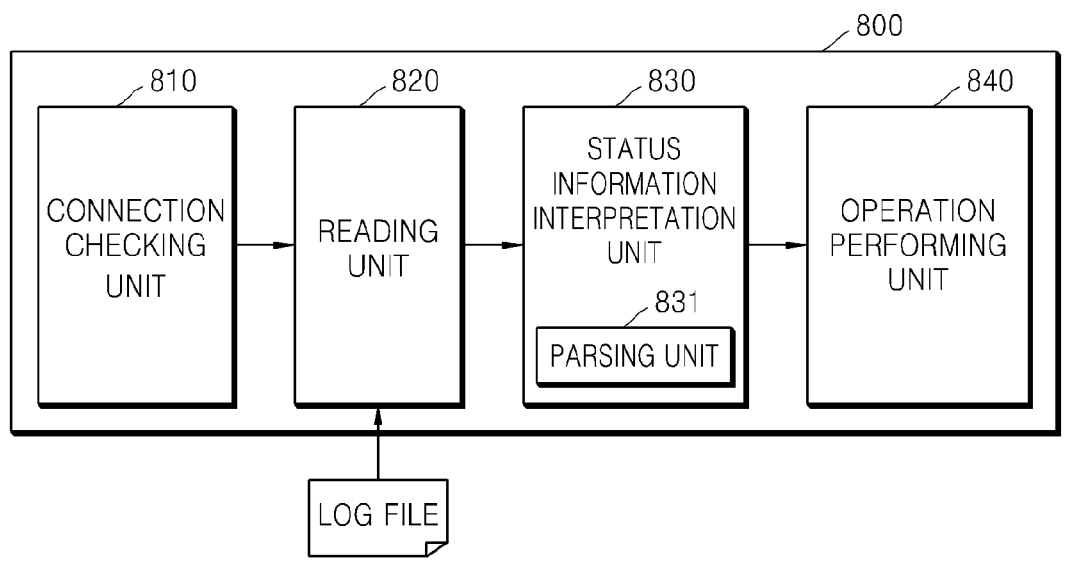
FIG. 8 is a block diagram of an apparatus for allowing content to be automatically reproduced in a multimedia content reproducing device based on status information, according to an exemplary embodiment.

FIG. 8 is a block diagram of an apparatus 800 for allowing content to be automatically reproduced in a multimedia content reproducing device based on status information according to an exemplary embodiment. The apparatus 800 allows content to be automatically reproduced in a second multimedia content reproducing device based on status information stored in a first multimedia content reproducing device. Referring to FIG. 8, the apparatus 800 includes a connection checking unit 810 that checks whether the first multimedia content reproducing device is connected to the second multimedia content reproducing device, a reading unit 820 that reads a log file including status information from the first multimedia content reproducing device when the checking reveals that the first multimedia content reproducing device is connected to the second multimedia content reproducing device, a status information interpretation unit 830 that interprets the status information, and an operation performing unit 840 that selectively performs an operation according to a result of the interpreting.

The status information interpretation unit 830 may include a parsing unit 831 that parses the status information.

According to the above exemplary embodiments, content can be automatically reproduced in a second device when a first device is connected thereto, based on the status information stored in the first device. Accordingly, user inconvenience can be minimized and the content can be automatically reproduced without having to perform a complicated search process, thereby enabling the user to seamlessly evaluate the content in an optimal environment.

Also, the content can be intelligently and automatically reproduced based on the status of the first device before the first and second devices are connected to each other, thereby guaranteeing continuous performance of desired operations.

The present invention can be embodied as a computer program. The computer program may be stored in a computer readable recording medium, and executed using a general digital computer.

As described above, the construction of the data used in the above exemplary embodiments may be recorded on a computer readable medium via various devices.

Examples of the computer readable medium include a magnetic recording medium (a ROM, a floppy disc, a hard disc, etc.), and an optical recording medium (a CD-ROM, a DVD, etc.).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of providing status information in a first content reproducing device, the method comprising:
   generating status information about a first operation of the first content reproducing device;
   providing the status information to a second content reproducing device that is connected to the first content reproducing device,
   wherein the status information is usable to determine a second operation to be performed by the second content reproducing device according to the first operation that is performed by the first content reproducing device.

2. The method of claim 1, further comprising recording, by the first content reproducing device, the status information in a log file stored by the first content reproducing device.

3. The method of claim 2, wherein the providing the status information comprises reading, by the second content reproducing device, the log file stored in the first content reproducing device.

4. The method of claim 2, wherein the status information comprises at least one parameter from among:
   a type of content used in the first content reproducing device;
   an operating mode of the content;
   whether the first content reproducing device is powered on or off;
   a content path of the content;
   a name of a file of the content;
   a location of the file;
   a running time of the content;
   a reproduction setting value of the content; and
   a location of the file being currently focused on.

5. The method of claim 2, wherein the providing the status information is performed when the first content reproducing device is connected to the second content reproducing device.

6. The method of claim 1, wherein the status information comprises information for identifying a content file that is being reproduced by the first content reproducing device, if the first operation that is being performed by the first content reproducing device is an operation of reproducing the content file.

7. The method of claim 6, wherein the status information comprises a parameter to indicate a location of a part of the file of the content, which is lastly reproduced in the first content reproducing device before the first content reproducing device is connected to the second content reproducing device.

8. A method of allowing content to be automatically reproduced in a second content reproducing device, the method comprising:
   connecting the second content reproducing device to a first content reproducing device;
   obtaining, by the second content reproducing device, status information from the first content reproducing device based on a connection to the first content reproducing device;
   performing, by the second content reproducing device, a second operation according to the status information,
   wherein the status information is used by the second content reproducing device to determine the second operation performed by the second content reproducing device according to a first operation that is performed by the first content reproducing device.

9. The method of claim 8, wherein the obtaining the status information comprises reading, by the second content reproducing device, a log file in which the status information is recorded, wherein the log file is stored in the first content reproducing device.

10. The method of claim 9, wherein the performing the second operation comprises:
    interpreting the status information recorded in the log file; and
    performing the second operation according to a result of the interpreting.

11. The method of claim 9, wherein the status information comprises at least one parameter from among:
    a type of content used in the first content reproducing device;
    an operating mode of the content;
    whether the first content reproducing device is powered on or off;
    a content path of the content;
    a name of a file of the content;
    a location of the file;
    a running time of the content;
    a reproduction setting value of the content; and
    a location of the file being currently focused on.

12. The method of claim 9, wherein the obtaining the status information is performed when the second reproducing device is connected to the first content reproducing device.

13. The method of claim 8, wherein the performing the second operation comprises reproducing, by the second content reproducing device, a content reproduced in the first content reproducing device.

14. The method of claim 13, wherein the performing the second operation comprises reproducing, by the second content reproducing device, the content starting from a location of a part of the content, which is lastly reproduced in the first content reproducing device before the second content reproducing device is connected to the first content reproducing device.

15. A non-transitory computer readable recording medium having recorded thereon a computer program for executing the method of claim 1.

16. A non-transitory computer readable recording medium having recorded thereon a computer program for executing the method of claim 8.

* * * * *